United States Patent
Williams et al.

[11] Patent Number: 5,833,294
[45] Date of Patent: Nov. 10, 1998

[54] MOBILE AUTOMOTIVE SERVICING FACILITY

[75] Inventors: Brian E. Williams; Barbara Bruck Williams, both of 1135 Spruce St., Winnetka, Ill. 60093

[73] Assignees: Barbara Bruck Williams; Brian E. Williams, both of Winnetka, Ill.

[21] Appl. No.: 622,220

[22] Filed: Mar. 27, 1996

[51] Int. Cl.⁶ ..................................................... B60P 3/14
[52] U.S. Cl. ............................ 296/24.1; 296/26; 414/537
[58] Field of Search ........................ 296/24.1, 26, 57.1, 296/61; 414/537; 137/234.6

[56] References Cited

U.S. PATENT DOCUMENTS

| | | | |
|---|---|---|---|
| 2,606,786 | 8/1952 | Howard | 414/537 |
| 2,765,938 | 10/1956 | Di Addezio | 410/24.1 |
| 2,832,637 | 4/1958 | De Cosse | 296/26 |
| 2,904,850 | 9/1959 | Couse et al. | 296/26 X |
| 3,308,845 | 3/1967 | Bellas et al. | 137/236.6 |
| 3,913,934 | 10/1975 | Koehn et al. . | |
| 4,119,224 | 10/1978 | Moody . | |
| 4,135,755 | 1/1979 | Steffens | 296/26 |
| 4,607,996 | 8/1986 | Koch | 414/537 |
| 4,724,875 | 2/1988 | Baldwin et al. | 141/98 |
| 4,981,318 | 1/1991 | Doane et al. | 296/24.1 |

FOREIGN PATENT DOCUMENTS

| | | | |
|---|---|---|---|
| 5077670 | 3/1993 | Japan | 414/537 |

*Primary Examiner*—Dennis H. Pedder
*Attorney, Agent, or Firm*—Jenner & Block

[57] ABSTRACT

A mobile automotive servicing facility (100) expands from a closed configuration for transport on highways and roads into a multibay service facility including multiple lifts (142) for servicing automobiles, a restroom (222), a customer waiting room/office area (144) and other amenities. In the closed configuration, the mobile automotive servicing facility resembles a double drop trailer. When deployed for maintenance on automobiles, outer side walls (120) of the facility are pivoted to extend the roof of the facility on both sides. Then inner side walls (122) are pivoted to extend the floor of the facility in an area under the extended roof. The extended floor (122) provides a ramp for ingress and egress of automobiles into the interior (128) of the facility. Contained within the interior of the facility are automobile lifts (142) and equipment for servicing the automobile, including oil change and chassis lubrication, filter replacement, wiper blade replacement, belt replacement and additional services.

26 Claims, 4 Drawing Sheets

FIG. 7

MOBILE AUTOMOTIVE SERVICING FACILITY

BACKGROUND OF THE INVENTION

1. Field of the Invention

This invention relates to a mobile facility for servicing automobiles, and in particular, to an expandable multibay automotive servicing facility capable of providing complete automotive maintenance and repair and fully accommodating customers.

2. Description of the Prior Art

Having routine maintenance done on an automobile has become more and more inconvenient. Neighborhood gas stations no longer pump gas for individuals, let alone provide any sort of maintenance. Facilities that do provide routine maintenance on automobiles have therefore become more widely dispersed, causing inconvenience to automobile owners by requiring them to travel farther to these facilities.

Additionally, the hours of operation of routine maintenance facilities are generally coincident with the working hours of a vast number of individuals. This adds to the inconvenience of obtaining routine maintenance. Those individuals not fortunate enough to rotate or otherwise adjust their working hours are forced to converge on automobile servicing facilities at the same time, namely lunch hours, directly before and after work and on weekends. This causes a high demand for routine maintenance service at the same periods of time, causing an additional inconvenience for automobile owners.

To alleviate the inconvenience of travelling to distant automobile servicing facilities at inconvenient times, mobile automotive servicing facilities have been proposed. The general idea behind such facilities is to provide a servicing facility that may travel to parking lots used by individuals during working hours, such as at large factories, office buildings, installations or shopping areas or other large public facilities where the automobile normally spends a great deal of time being idle. Example mobile servicing facilities are disclosed in U.S. Pat. No. 4,981,318 to Doane et al. and U.S. Pat. No. 3,308,845 to Bellas et al.

Doane et al. discloses a mobile service facility including a frame, having a floor, a forward end, a rearward end, and spaced sides extending between the ends. A roof overlies the floor. An entrance for an automobile is provided at the forward end of the apparatus. Corner post assemblies are positioned adjacent the forward end of the frame and on one side of the frame for maintaining the roof space above the floor. Each corner post assembly is movable between a closed position for travel and an open position in which the forward end is widened so that a vehicle wider than the spaced sides of the frame may be driven onto the floor without interference from the corner post assemblies. The spaced side walls disclosed in Doane et al. are extendable so that a vehicle wider than the spaced sides in the closed configuration may be driven onto the floor.

Bellas et al. discloses a mobile automotive servicing facility having a van body portion consisting of side wall portions, a front wall portion, a back portion, and top wall portion. An entrance is provided at the back portion of the van body for ingress and egress by an automobile. A lift is provided to receive the automobile entering through the rear entrance. Extendable top portions and side portions of the van body may be pivoted to extend the top and width of the van body for servicing the automobile.

Doane et al., Bellas et al. and other prior mobile servicing facilities have several shortcomings that have limited their acceptance and use. For example, these prior facilities have failed to adequately accommodate a sufficient number of vehicles in a timely manner due to space limitations. Space limitations also prevent service technicians from having convenient and adequate access to the vehicle and deprive customers of the normal amenities associated with automobile servicing, such as a waiting room and restroom facilities. These prior facilities have also been lacking in safety features. Additionally, prior mobile servicing facilities have failed to provide an environment with suitable protection from inclement weather, including extreme cold, heat, snow, rain, etc.

In light of these shortcomings, a need exists for a mobile automotive servicing facility with adequate capability to timely service numerous vehicles, provide adequate space and access for service technicians to not only perform services better, but also perform more services, and provide a comfortable environment for employees and customers, including customer amenities.

SUMMARY OF THE INVENTION

Accordingly, the present invention provides a mobile automotive servicing facility that expands into a single or multiple bay service facility, including at least one lift for servicing automobiles, a complete office, restroom, a customer waiting area and other amenities desired by the customer. The mobile automotive servicing facility is self-contained and self-sustaining and includes several environmentally safe features. Its ability to be transported to locations convenient to customers, avoids customers having to travel to the facility during inconvenient times.

In one aspect, the mobile automotive servicing facility has a frame, such as a frame normally used for a tractor trailer. The frame supports a floor and a roof overlying the floor. Side walls extend from the floor to the roof on opposite sides of the frame to partially enclose the interior area of the servicing facility. At least one opening is provided in the side of the facility for ingress and egress by automobiles to and from the interior of the facility. The interior of the servicing facility contains a predetermined number of lifts for vertically lifting one or more automobiles above the floor to provide access for servicing by service technicians. The lifts are contained within a large working area for conveniently and adequately servicing the automobiles. Additionally, the interior of the facility includes an office and customer waiting area, storage space, a restroom, and a generator for supplying the necessary power to operate the facility.

In another aspect, the mobile automotive servicing facility expands from a closed configuration for transport from one location to another, to an open configuration for accepting automobiles for servicing. At least one opening is provided in the side of the facility for ingress and egress by automobiles. In the closed configuration, the opening is closed by two movable side walls that overlap. In the open configuration, the outer movable side wall extends to be generally parallel to the roof, extending the overhead coverage of the facility away from the sides. The inner movable side wall extends to be generally parallel to the floor of the facility for some distance before tapering, extending the floor and area of the facility. The inner movable side wall may taper into a ramp or may have a ramp attached that extends to an exterior surface, such as asphalt or pavement, upon which the facility rests. The ramp provides access to the interior of the facility by an automobile.

The inner and outer movable side walls are pivoted between the open and closed positions by suitable means, such as hydraulics. An additional opening with movable side walls may be placed on the opposite side of the facility, thereby further extending the floor and roof of the facility and providing an additional access for ingress and egress by automobiles.

To provide a comfortable working environment, a retractable heavy-duty wall is provided to enclose the extended portions of the facility. Additionally, heating and cooling facilities are used to regulate the internal temperature of the facility.

DETAILED DESCRIPTION OF THE PREFERRED EMBODIMENTS

Figure 1:
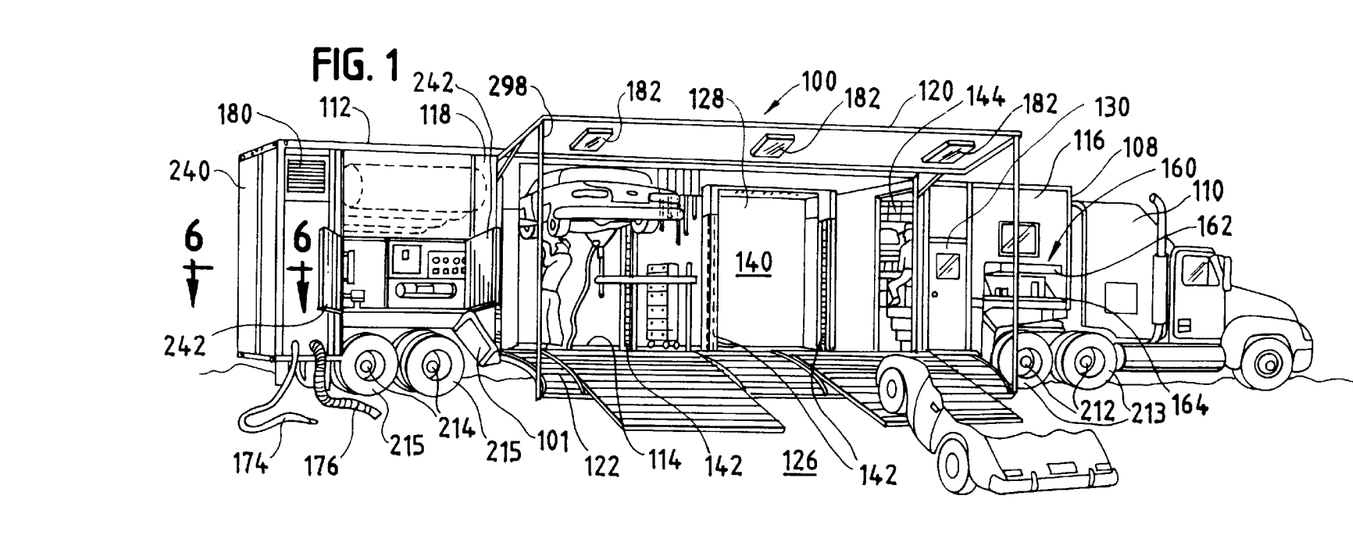
FIG. 1 is a perspective view of a preferred embodiment of a mobile automotive servicing facility in accordance with the present invention.

Turning to the drawings, FIG. 1 shows a perspective view of a preferred embodiment of a mobile automotive servicing facility in accordance with the present invention, wherein the facility is extended in an open configuration to fully accommodate two automobiles in the interior of the facility. Alternative embodiments could accommodate one automobile or more than two automobiles, depending upon the size of the facility and the needs of the user. The mobile automotive servicing facility 100 is formed from a customized tractor trailer that meets the requirements of interstate transportation regulations, allowing the facility to be transported on streets and highways. A truck or tractor 110 is used to transport facility 100. When deployed for servicing automobiles, facility 100 is self-contained and self-sustaining and need not be attached to truck 110. Preferably, facility 100 is formed from a 52.5 foot, double drop trailer with approximately 31 feet in the drop area and 4.5 feet in the rear behind the rear axles.

Facility 100 has a frame 101 that is partially shown in FIG. 1. Frame 101 is attached to rear or aft axles 214 which are supported by rear wheels 215 in a normal manner. The front portion of facility 100 is adapted to be mounted on truck 110 above fore axles 212 that are supported by wheels 213.

Frame 101 supports a main roof 112 and a main floor 114, as is normal with trailers of this type. Front side wall 116 and back side wall 118 extend from main floor 114 up to main roof 112. Swing doors 240 are provided for access to the back portion of facility 100 while front wall portion 108 is closed. The side of facility 100 shown in FIG. 1 is generally a mirror image of the opposite side of facility 100 (not shown), except that a door 130 is provided only on the side shown.

Between front side wall 116 and back side wall 118 is an opening. Within the area of the opening is an extended roof 120 which extends the overhead protection of main roof 112 in an area adjacent the side of facility 100. Under extended roof 120 is an extended floor 122 which extends from main floor 114 to the exterior surface 126 (such as a parking lot, driveway or the ground) on which facility 100 and any vehicles are parked.

The extended roof 120 and extended floor 122 increase the size of facility 100 substantially. As an example, a facility that is 8.5 feet wide and 52.5 feet long, without extended portions, provides approximately 446 square feet of space. Adding extended floors on both sides of the facility that expand 10 feet away from the sides of the facility for at least 25 feet, adds approximately 500 square feet of space, more than doubling the total amount of working area.

Shown within interior 128 of facility 100 is a service area 140 where automobiles are serviced. Service area 140 includes two automobile lifts 142 for raising automobiles above floor 114 for easy access by a service technician. Adjacent service area 140 is a customer waiting room/office space 144.

The novel arrangement of the service area 140, including automobile lifts 142, facilitates complete automotive maintenance and repair. Examples of services that may easily be accommodated within service area 140 include oil change and chassis lubrication, filter replacement, windshield wiper blade replacement, belt replacement, safety inspection, tire rotation, emissions check, winterizing, headlight replacement, transmission repair and replacement, transmission fluid change, wheel alignment, tune-ups, brake repair, muffler repair and replacement and other maintenance and repair services.

On the exterior of front side wall 116 is a coffee bar 160. Coffee bar 160 has a collapsible canopy 162 and a collapsible stand 164. Stand 164 is used to support coffee, tea and other beverages supplied for customers. Coffee bar 160 is one of the amenities desired by customers that facility 100 provides.

Figure 2:
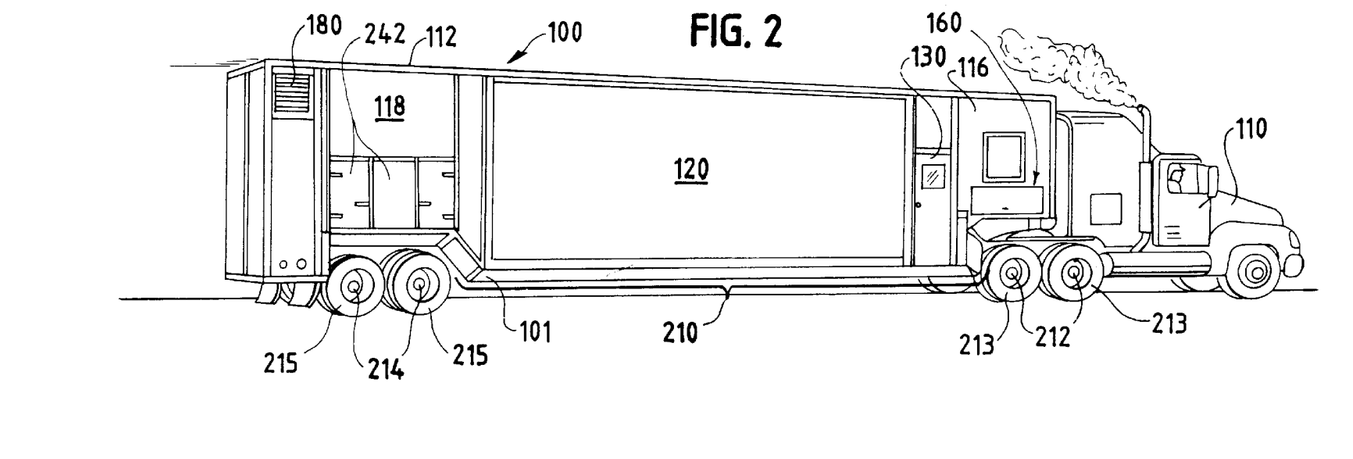
FIG. 2 is a perspective view of the mobile automotive servicing facility of FIG. 1 shown in a configuration for transportation from one location to another.

FIG. 2 is a perspective view of mobile automotive servicing facility 100 shown in a configuration for transportation from one location to another. In the closed configuration, facility 100 appears as a normal trailer that travels on streets and highways. Preferably, in the closed configuration, facility 100 conforms to federal regulations regarding interstate transportation and is not prohibited from, nor required to have any special permits for, traveling on highways. Preferably, facility 100 is a 52.5 foot double drop trailer. The drop area 210 is located between fore axles 212 and aft axles 214 and is preferably 31 feet in length. Facility 100 includes an air ride suspension option commercially available on standard double drop trailers. The air ride suspension option allows facility 100 to be raised or lowered 4 inches from its standard driving height. Preferably, a manual override system is added to the air ride suspension option to bypass the automatic adjustment of the height of the trailer to allow the facility's height to be manually adjusted according to the environment where facility 100 will be utilized. Adjustment of the facility's height advantageously allows optimal selection of the size and angle of extended floor 122.

Figures 5, 6:
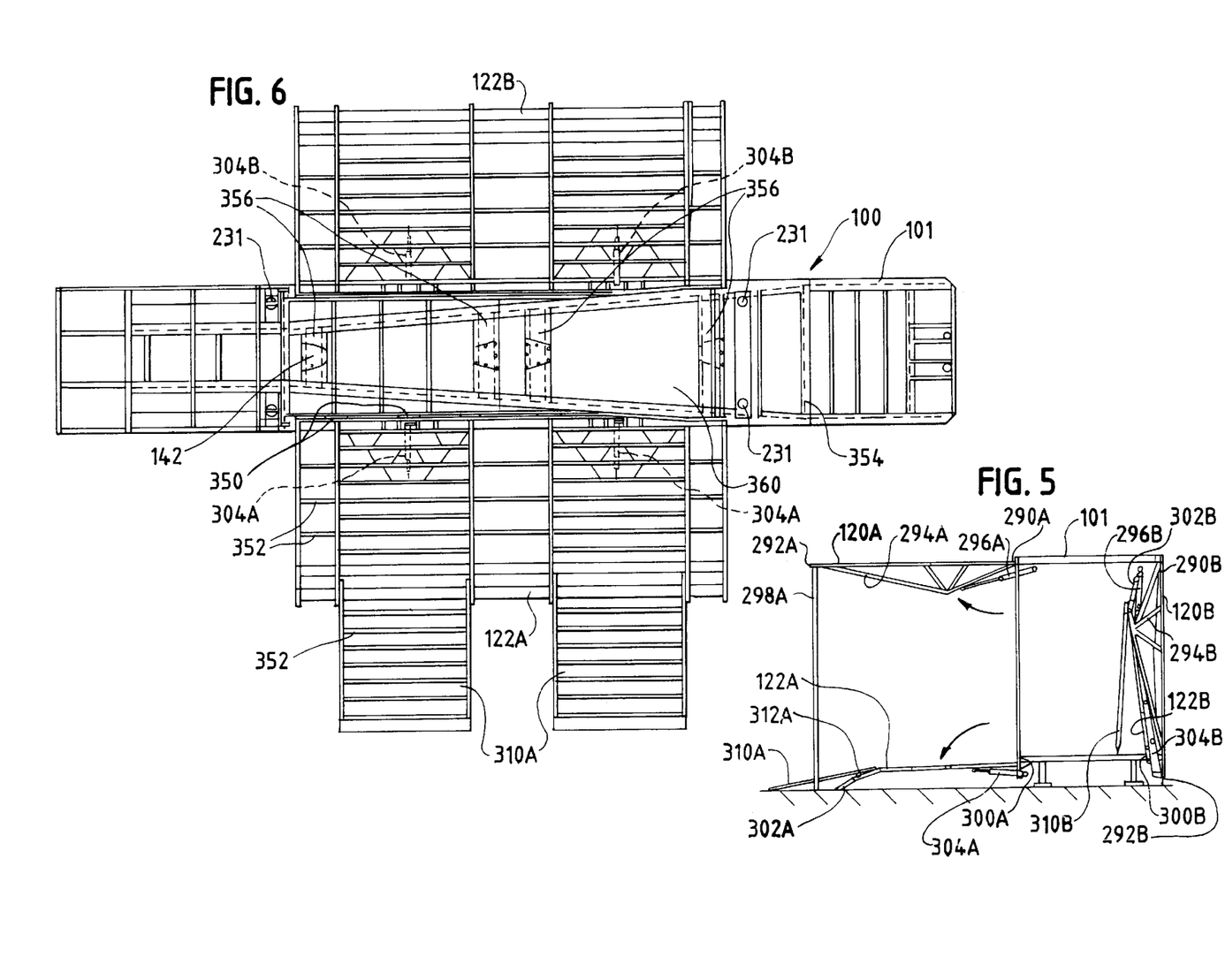
FIG. 5 is a cross-sectional view of the mobile automotive servicing facility shown in FIG. 1 taken along line 5—5 of FIG. 4.
FIG. 6 is a cross-sectional view of the mobile automotive servicing facility shown in FIG. 1 taken along line 6—6 in FIG. 1 with ramps extended for ingress and egress by an automobile.

In the closed configuration, extended roof 120 is pivoted to form an outer side wall of facility 100. As best seen in FIG. 5, extended floor 122 is pivoted to be an inner side wall resting parallel and adjacent to extended roof 120 within interior 128 of facility 100. Extended roof 120 and extended floor 122 rest parallel front side wall 116 and back side wall 118 to form a complete side of facility 100. Similarly, canopy 162 of coffee bar 160 is pivoted to its collapsed position. Stand 164 is detachable for storage within facility 100.

An alternative for extending the roof and/or floor of facility 100 is to have the extended portion be slidably retracted into and extended from interior 128, with the extended portions remaining substantially parallel to the main roof and main floor in the open and closed configurations, and therefore being constrained in size by the width of the main roof and floor. However, since the width of the main roof and floor is generally less than the height of a side of facility 100, the preferred embodiment stores the extended portions parallel to the side of facility 100 in the closed configuration, pivoting the extended portions to the open configuration, thereby maximizing the size of the extended portions.

Figure 3:
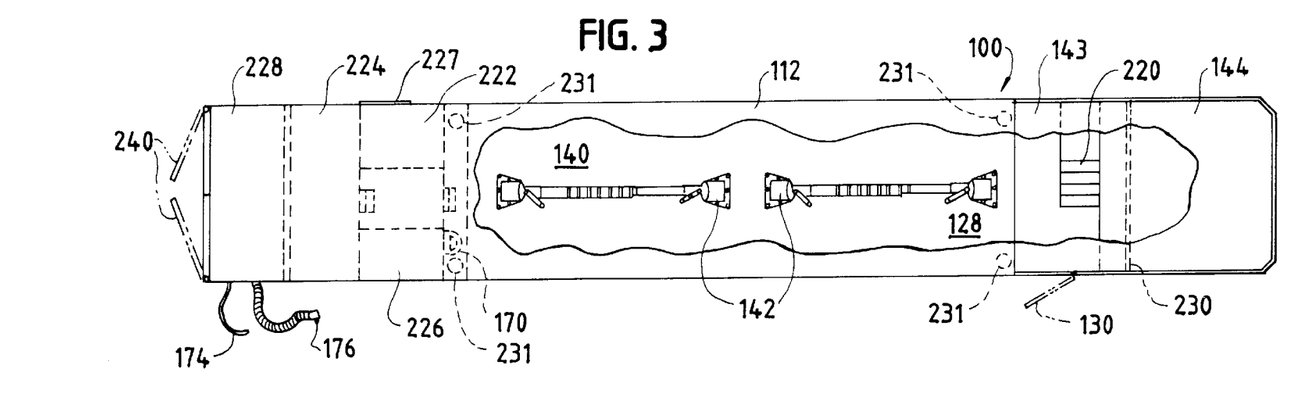
FIG. 3 is a top plan view of the mobile automotive servicing facility shown in FIG. 1, illustrating a layout of the facility.

FIG. 3 is a top plan view of mobile automotive servicing facility 100 showing generally the layout of interior 128. Centrally located and comprising the majority of interior 128 is service area 140, including automobile lifts 142, shown through a partially cut-away portion of main roof 112. The area surrounding lifts 142 is used for storage of tools and supplies, dispensing systems and other items for use in servicing automobiles. Door 130 provides access to interior 128, eliminating the need for customers to enter interior 128 from the automobile ingress and egress area. Just beyond door 130, in a front area 143, are steps 220, which provide access to customer waiting room/office space 144. Customer waiting room/office space 144 has a raised floor due to its location above the fore axles 212. Opposite customer waiting room/office space 144 in the area adjacent service area 140, above the aft axles 214, are several auxiliary facilities including, for example, restroom 222, storage area 224, control panel area 226 and auxiliary control panel area 227. Adjacent the auxiliary facilities in the back drop extended area of the trailer is compressor and generator room 228.

Customer waiting room/office space 144 is generally in the area above fore axles 212. In the preferred embodiment, this area is approximately 8.5 feet by 8.5 feet, providing a total of 72.25 square feet of space. Customer waiting room/office space 144 serves as the customer waiting area as well as the office. Customer waiting room/office space 144 may include, for example, a desk, computer, monitor, printer, fax, modem, telephone, file cabinet and other such amenities. Preferably, a sliding glass door 230 isolates the noise of service area 140 from office space 144, but provides visibility of the service area 140 at all times. Visibility of service area 140 is essential for both internal quality control and customer assurance.

Restroom 222 is provided in the rear of facility 100. Restroom 222 is accessible by both employees of the facility and customers, providing one common amenity associated with automobile servicing facilities. Restroom 222 features a toilet, such as that found in recreation vehicles. The toilet empties into a 25-gallon waste water tank provided below restroom 222.

A sink 170 is provided adjacent service area 140. Sink 170 receives fresh water from a 100-gallon fresh water tank and empties into a comparably sized waste water tank.

As may be appreciated, space is at a premium in facility 100. A storage area is shown generally by reference numeral 224. However, storage is found throughout the facility including the walls of service area 140. Given the mobile nature of facility 100, all storage compartments are enclosed, including locking front and compartmentalized internal sections, to minimize shifting of contents when facility 100 travels from one location to another. Storage tanks for fresh (unused) oil, windshield wiper solvent, fresh water and waste water are located in front area 143. Preferably, front area 143 holds a 310 gallon oil tank built under steps 220. Front area 143 also preferably features a 125 gallon oil tank, a 100 gallon windshield wiper solvent tank, and a 100 gallon fresh water tank along the back wall behind steps 220. Separately, a 75 gallon spare tank, a 72 gallon diesel fuel tank and a 90 gallon waste water tank are located in rear storage area 224.

Compressor and generator room 228 houses an air compressor for supplying air throughout facility 100, a generator for providing the electrical power for facility 100 and a heating system for warming facility 100. Compressor and generator room 228 is accessible from outside facility 100 via rear swing doors 240. Air vents 180, shown in FIGS. 1 and 2, provide ventilation to the equipment in compressor and generator room 228. Preferably, the air compressor is a 120 gallon 5 horse power duplex air compressor and the generator is a 20 kilowatt diesel fuel generator. Piping, tubing and conduit, for supplying air and electrical power throughout the facility are run from room 228 via the floor, ceiling and walls to the necessary locations. An air hose 174 is provided at the rear of facility 100 for use by customers.

Control panel area 226, which is accessible by door panels 242 shown in FIGS. 1 and 2, contains the electrical panel, propane tanks for heating fuel, and diesel fuel tanks. Hydraulic controls for pivoting the extended roof and floor are located in control panel area 226 for the hydraulics on the same side of the facility as control panel area 226. Hydraulic controls for pivoting the extended roof and floor on the opposite side of the facility are found in auxiliary control panel area 227.

A central vacuum system is located in compressor and generator room 228. Vacuum hoses are provided within service area 140. Additionally, hose 176 is located outside facility 100 for use by customers. A large tank is located in compressor and generator room 228 and collects debris from the central vacuum system.

Figure 4:
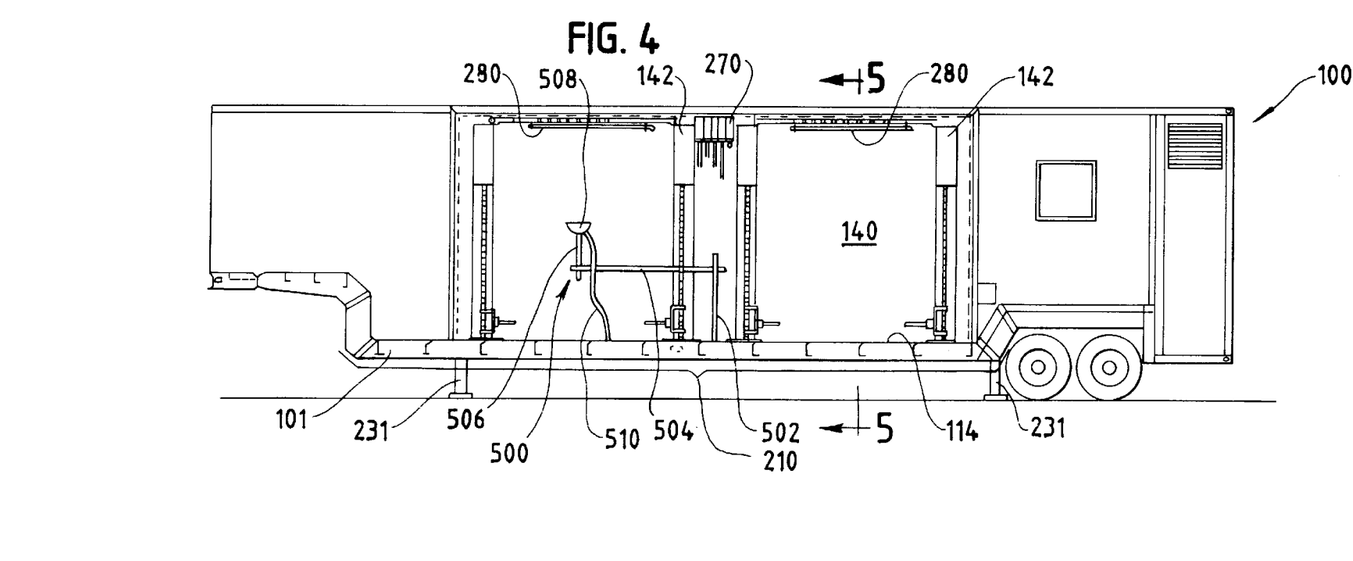
FIG. 4 is a side view of the mobile automotive servicing facility shown in FIG. 1.

Four leveler jacks 231 are shown in phantom in FIG. 3. Leveler jacks 231 are hydraulic jacks mounted to frame 101. When deployed for servicing automobiles, leveler jacks 231 are lowered to contact the surface supporting facility 100, as shown in FIG. 4. Independent adjustment of leveler jacks 231 allows facility 100 to be stabilized and leveled. This is a critical safety feature since most parking areas where the facility is to be deployed have very uneven surfaces.

A complete lighting system powered by the generator is provided on facility 100. Even extended roof 120 has lights 182, shown in FIG. 1, that provide lighting in the extended portions of facility 100. Preferably fluorescent lights are provided throughout facility 100, including compressor and generator room 228, restroom 222, customer waiting room/office space 144, and service area 140.

FIG. 4 is a side view of mobile automotive servicing facility 100 shown in an open configuration for receiving an automobile. The extended roof and floor are not shown in FIG. 4 for clarity. Interior 128 of facility 100 has two service bays, generally defined by lifts 142. The number of bays is somewhat constrained by the area of the truck in drop area 210, which in turn is constrained by interstate transportation regulations. It may be readily appreciated that changes in interstate transportation regulations or in the size of vehicles to be serviced or changes in the frame of the facility may have an effect on the number of bays contained within service area 140, allowing additional lifts. Located between lifts 142 is a dispensing area 270. Dispensing area 270 provides convenient access to fluids and air for servicing automobiles.

A distinct advantage of the present invention over prior art systems is the use of lifts to vertically extend automobiles above floor 114 for easy access by service technicians. Moreover, arranging the service bays within the drop area 210 of facility 100 allows multiple automobiles to be serviced simultaneously. Interstate transportation regulations limit the height of trailers and, thus, the maximum floor to ceiling height within interior 128 of facility 100. Lifts 142 were chosen to meet these constraints. Lifts 142 are preferably hydraulic twin post lifts with a 9000 pound capacity each. The preferred lifts are manufactured by Rotary Lift Company of Madison, Ind., sold as model number SP09. With the preferred lifts, the average car may be raised 6.5 feet above floor 114, allowing convenient access for service technicians.

Due to the limited height constraints and the need to protect both the automobiles on the lifts and the roof of facility 100, the lifts are preferably equipped with components to limit the height of automobiles on the lift. Lifts 142 are equipped with trip wire 280 that senses the vertical height of an automobile on the lift and automatically shuts off the lift, limiting the height of the automobile. Additionally, lifts 142 are equipped with a sleeve (not shown) that limits the rise of the lift's internal pistons.

Dispensing area 270 preferably dispenses multiple grades of motor oil, windshield wiper solvent, lubricating grease and compressed air. The oil, windshield wiper solvent and lubricating grease are pumped from storage tanks located in storage area 224 and front area 143. The compressed air is pumped from the compressor located in compressor and generator room 228. Other fluids, such as brake fluid, power steering fluid, water, and antifreeze, may also be dispensed from dispensing area 270. Preferably, reels are provided to manage hoses used to disperse oil and windshield wiper solvent.

A novel direct drain system 500 is shown in FIG. 4. A direct drain system per lift is preferred. Direct drain system 500 allows for draining fluids from automobiles. Preferably, direct drain system 500 allows drainage of used oil from vehicles and storage of that used oil in an environmentally safe manner. Direct drain system 500 is mounted to main floor 114 in an area near lifts 142 by support 502. A swing arm 504 is attached to support 502 in any known manner such that the vertical height of swing arm 504 is adjustable. Swing arm 504 pivots or rotates around support 502. At the end of swing arm 504 opposite support 502 is a support 506 that holds a drain pan 508. Support 506 may be adjusted vertically and horizontally with respect to swing arm 504. The adjustable configuration of direct drain system 500 allows pan 508 to be placed directly under the oil drain plug of automobiles on lifts 142. A hose 510 allows the contents of pan 508 to flow directly to storage tanks mounted within main floor 114. Direct drain system 500 reduces the amount of handling associated with transporting used oil from the automobile to a tank for storage, thereby reducing the possibility of inadvertent spills. Additionally, main floor 114 may have a raised lip portion (not shown) around its perimeter to prevent any inadvertent spills from leaving the confines of facility 100.

FIG. 5 is a cross-sectional view of facility 100 taken along line 5—5 in FIG. 4. Facility 100 is shown in FIG. 5 in a partially open or deployed configuration, wherein one side of facility 100 (side A) has extended roof 120A and extended floor 122A in the open or deployed configuration and the other side (side B) has extended roof 120B and extended floor 122B in the closed configuration. Extended roofs 120A–B are pivotally attached at ends 290A–B to frame 101 of facility 100. The opposite ends 292A–B of extended roof 120A–B are not attached. Brackets 294A and 294B support extended roof 120A and 120B, respectively. Hydraulic rams 296A and 296B, respectively, are attached at one end to frame 101 and at the opposite end to brackets 294A and 294B for extending extended roofs 120A and 120B. Preferably, two hydraulic rams are used for extended roof 120A and two hydraulic rams are used for extended roof 120B. When fully extended, extended roof 120A is further supported by poles 298A, which are preferably placed at the ends of extended roof 120A. Poles 298A are a secondary safeguard support, while hydraulic rams provide opening and closing motion and primary support.

Extended floors 122A, 122B are attached at ends 300A, 300B, respectively, to frame 101. The free ends 302A, 302B of extended floors 122A, 122B are curved. Hydraulic rams 304A, 304B are used to extend and retract extended floors 122A, 122B, respectively. Preferably, two hydraulic rams are used for extended floor 122A and two hydraulic rams are used for extended floor 122B, as shown in FIG. 6. Hydraulic rams on side A are controlled from control panel area 226, while hydraulic rams on side B are controlled from auxiliary control panel area 227. Preferably, each hydraulic ram extends within 22 seconds and retracts within 22 seconds. An extended ramp 310A, which has rollers 312A at attached at a first end, may be manually extended to provide a ramp for ingress and egress by an automobile. The ramp is provided by resting the rollers 312A of the first end of extended ramp 310A on the extended floor and resting the opposite end of extended ramp 310A on the surface supporting facility 100. In FIG. 5, ramps 310A and 310B are shown on both sides of facility 100 but may be included on only one side of facility 100 as shown in FIG. 6, limiting automobile ingress and egress to one side of facility 100.

FIG. 6 is a cross-sectional view of mobile automotive servicing facility 100 shown in an open configuration. In FIG. 6, the base of frame 101 is shown. Extended floor 122 is attached by hinges 350 to frame 101. Extended floor 122 is made of aluminum and has steel members 352 for reinforcement. Ramp extensions 310A similarly are made of aluminum and reinforced with steel members 352. Frame 101 has cross support members 354 for reinforcing frame 101. Additionally, support members 356 are provided for extra support for the post of lifts 142. Used oil storage tank 360 is advantageously located between support members in the floor of facility 100 for holding used motor oil extracted from automobiles using direct drain system 500. Support cross members in the floor of facility 100 protect storage tank 360 from damage in case of a collision or other mishap.

Figure 7:
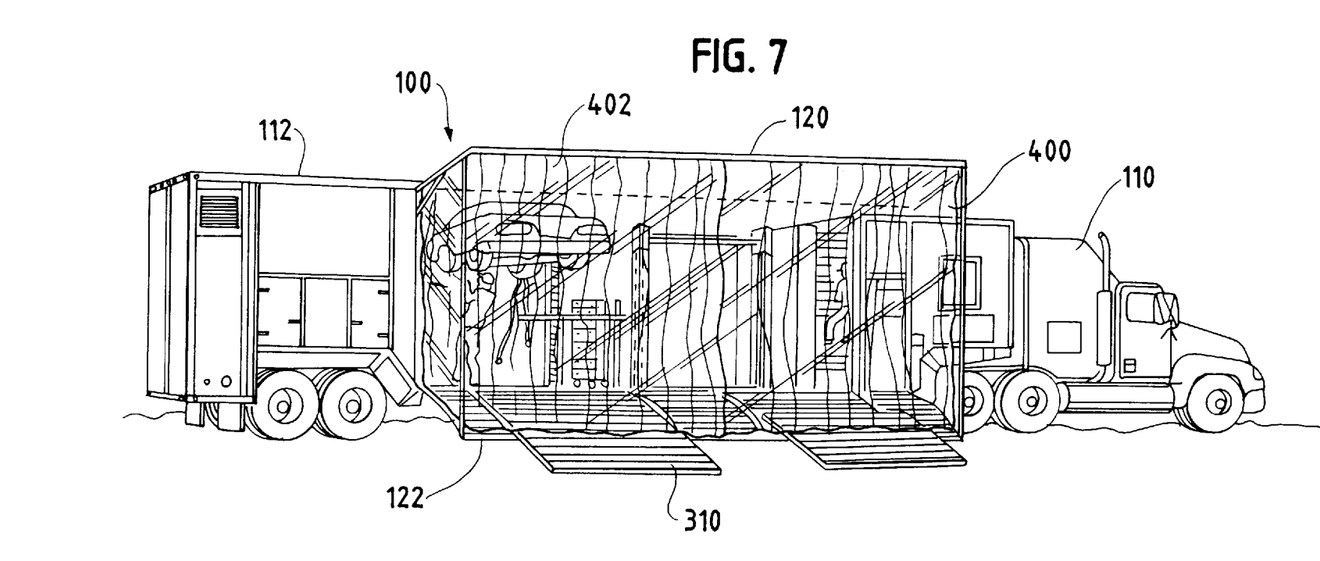
FIG. 7 is a perspective view of the mobile automotive servicing facility shown in FIG. 1 enclosed for protection from inclement weather.

FIG. 7 is a perspective view of mobile automotive servicing facility 100 shown enclosed for protection from inclement weather. Retractable walls 400, 402 are extended around the perimeter of extended roof 120 and are then attached to extended floor 122. Retractable walls 400, 402 meet near the center of the opening for ingress and egress of the automobile. A similar arrangement of retractable walls may be provided at the opposite side of facility 100 around the extended roof and extended floor. The retractable walls are preferably made of heavy duty vinyl. When enclosed, as shown in FIG. 7, the temperature within interior 128 of facility 100 is suitably controlled by two central heating systems or cooling fans. Additionally, interior 128 is protected from precipitation. One heating system circulates hot water throughout facility 100. The other heating system uses propane fuel.

In operation, first facility 100 is placed in the closed configuration, as shown in FIG. 2. Facility 100 may then be transported to a desired location, such as a parking lot of a large corporate facility or other location where many cars are parked, by truck 110. Once at the desired location, truck 110 is no longer needed. In preparation for expanding facility 100, first the manual override on the air ride suspension system is adjusted to set the truck at the desired height above the surface supporting it. Then, leveler jacks 231 are adjusted to level facility 100 upon its supporting surface. Once facility 100 is level, extended roofs 120A, 120B are pivoted into position by their respective hydraulic rams. Then, extended floors 122A, 122B are pivoted into position by their respective hydraulic rams. The extended roof is then further supported by poles 298. The extended ramps 310A–B are then manually extended for ingress and egress by automobiles. Depending on the weather, retractable walls 400, 402 may be enclosed around facility 100. Facility 100 is then ready to conveniently provide full service maintenance to automobiles.

While the present invention has been described with respect to specific embodiments thereof, it will be understood that various changes and modifications will be suggested to one skilled in the art and it is intended that the invention encompass such changes and modifications as fall within the scope of the appended claims.

What is claimed is:

1. A mobile automotive servicing facility comprising:
   a frame;
   a floor supported by said frame;
   a roof supported by said frame, said roof overlying said floor;
   fixed side walls extending from said floor to said roof on opposite sides of said frame to partially enclose and to define an interior of said servicing facility;
   an outer side wall attached at one end to said frame to pivot between a closed position wherein said outer side wall is generally parallel to said fixed side walls and an open position wherein said outer side wall is generally parallel to said roof and extends said roof; and
   an inner side wall attached at one end to said frame to pivot between a closed position wherein said inner side wall is generally parallel to said fixed side walls and an open position wherein said inner side wall extends from said floor to an exterior surface that supports an automobile to be serviced.

2. The facility of claim 1 wherein said frame has a drop area and said outer side wall and said inner side wall are attached to said frame in said drop area.

3. The facility of claim 1 wherein said outer side wall is pivoted under the control of hydraulic rams.

4. The facility of claim 1 wherein said inner side wall is pivoted under the control of hydraulic rams.

5. The facility of claim 1 further comprising a ramp extension with rollers attached at a first end, said rollers resting on said inner side wall when said inner side wall is in the open position, said ramp extension having a second end opposite said first end that rests on said exterior surface that supports an automobile.

6. The facility of claim 1 further comprising a plurality of adjustable jacks that are attached to said frame and extend from said frame to a surface supporting said frame.

7. The facility of claim 1 further comprising a predetermined number of lifts located within the interior of the facility, each lift being adapted to vertically lift an automobile above the floor.

8. The facility of claim 7 wherein said predetermined number of lifts is two.

9. The facility of claim 7 wherein said lifts are hydraulic.

10. The facility of claim 9 wherein each of said lifts comprises twin post lifts.

11. The facility of claim 7 further comprising a sensor attached adjacent the roof within the interior of the facility, said sensor sensing an automobile on one of said lifts and said lift being responsive to said sensor to be shut off if said sensor determines a height of said automobile on said one of said lifts is unfavorable.

12. The facility of claim 1 further comprising an office area within the interior of the facility.

13. The facility of claim 1 further comprising a restroom within the interior of the facility.

14. The facility of claim 1 further comprising retractable walls adapted to attach to, and enclose, a perimeter of said outer side wall and inner side wall, when said outer and inner side walls are both in the open position.

15. The facility of claim 1 further comprising hydraulic jacks attached to said frame at one end that are adapted to extend at an opposite end to the exterior surface.

16. The facility at claim 1 wherein said inner side wall is attached within a drop area of said facility.

17. The facility of claim 1 further comprising a coffee bar attached to one of said fixed side walls.

18. The facility of claim 1 further comprising within the interior of said facility:
    a pan for receiving fluid from an automobile; and
    a hose connected at one end to receive contents from said pan and connected at an opposite end to a storage tank.

19. The facility of claim 18 wherein said pan is adjustably supported by support means.

20. The facility of claim 18 wherein said storage tank is secured within said floor.

21. The facility of claim 1 further comprising a door for customer access, said door being attached to one of said fixed side walls.

22. The facility of claim 1 further comprising oil tanks positioned within the frame underneath the floor.

23. A mobile automotive servicing facility comprising:
    a frame at least partially supported by wheels and adapted to be movable from a first location to a second location;
    a floor supported by said frame;
    a roof supported by said frame, said roof overlying said floor;
    fixed side walls extending from said floor to said roof on opposite sides of said frame to partially enclose and to define an interior of said facility;
    said fixed side walls enclosing an opening for ingress and egress to the interior of the facility by an automobile; and
    an automotive lift secured to said floor of said facility for lifting and lowering an automobile vertically within said interior of said facility.

24. The facility of claim 23 wherein said lifts are hydraulic.

25. The facility of claim 23 wherein said lift comprises a twin post lift.

26. The facility of claim 23 further comprising a sensor attached to the roof extending within the interior of the facility, said sensor sensing an automobile on said lift and said lift being responsive to said sensor to be shut off if said sensor determines that said automobile has reached a predetermined height.

* * * * *